US008754158B2

(12) United States Patent
Hattori et al.

(10) Patent No.: US 8,754,158 B2
(45) Date of Patent: Jun. 17, 2014

(54) STUDLESS TIRE FOR PASSENGER VEHICLE

(75) Inventors: Takayuki Hattori, Kobe (JP); Ryoji Kojima, Kobe (JP); Naohiko Kikuchi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 228 days.

(21) Appl. No.: 12/484,560

(22) Filed: Jun. 15, 2009

(65) Prior Publication Data

US 2010/0056685 A1    Mar. 4, 2010

(30) Foreign Application Priority Data

Sep. 1, 2008   (JP) .................................. 2008-224049

(51) Int. Cl.
| | |
|---|---|
| C08K 5/04 | (2006.01) |
| C08K 5/09 | (2006.01) |
| C08F 2/08 | (2006.01) |
| C08K 5/00 | (2006.01) |
| C08K 3/18 | (2006.01) |
| C08K 3/22 | (2006.01) |

(52) U.S. Cl.
USPC ............ 524/399; 524/394; 524/396; 524/432

(58) Field of Classification Search
USPC ........................ 524/284, 394, 396, 399, 432
See application file for complete search history.

(56) References Cited

U.S. PATENT DOCUMENTS

| | | | | |
|---|---|---|---|---|
| 5,302,315 A | * | 4/1994 | Umland | ................... 252/182.14 |
| 6,021,831 A | * | 2/2000 | Yamauchi et al. | ......... 152/209.7 |
| 2001/0051551 A1 | | 12/2001 | Maruoka | |
| 2004/0211111 A1 | | 10/2004 | Kikuchi | |
| 2005/0032960 A1 | | 2/2005 | Kishimoto et al. | |
| 2008/0105346 A1 | * | 5/2008 | Toyoda | ...................... 152/209.4 |
| 2009/0152760 A1 | | 6/2009 | Kishimoto et al. | |

FOREIGN PATENT DOCUMENTS

| | | | |
|---|---|---|---|
| JP | 2002-17898 A | | 1/2002 |
| JP | 2003-213044 A | | 7/2003 |
| JP | 2003-292674 A | | 10/2003 |
| JP | 2005-53977 A | | 3/2005 |
| JP | 2005-146208 A | | 6/2005 |
| JP | 2005-239814 A | * | 9/2005 |
| JP | 2006-16527 A | | 1/2006 |
| JP | 2007-176417 A | | 7/2007 |
| JP | 2007-321041 A | | 12/2007 |
| JP | 2003-213039 A | | 7/2008 |

* cited by examiner

Primary Examiner — Angela C Scott
(74) Attorney, Agent, or Firm — Birch, Stewart, Kolasch & Birch, LLP

(57) ABSTRACT

The present invention has its object to provide a high performance studless tire for a passenger vehicle which has both good braking force and high handling stability on ice or snow. The studless tire for a passenger vehicle comprises a tread having a total sulfur content of 0.7% by mass or less and having a crosslink density of $2.0 \times 10^{-5}$ mol/cm$^3$ or higher.

9 Claims, 1 Drawing Sheet

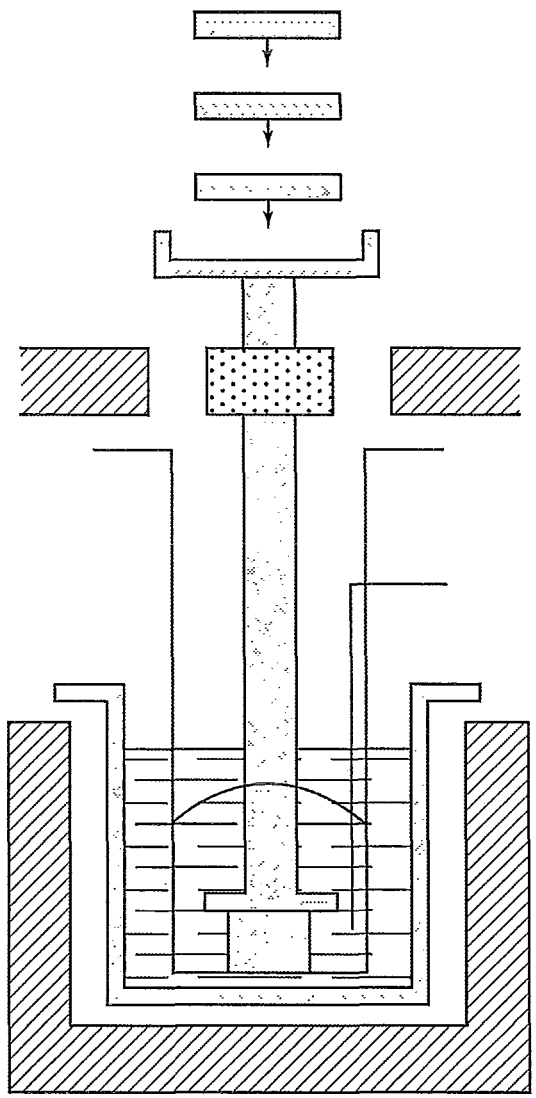

STUDLESS TIRE FOR PASSENGER VEHICLE

TECHNICAL FIELD

The present invention relates to a studless tire (a winter tire) for a passenger vehicle.

BACKGROUND ART

Use of spike tires has been banned by law in Japan so as to prevent powder dust pollution resulting from the spike tires, and thus studless tires are now used instead of the spike tires in cold regions. In order to improve grip performance of the studless tires on ice or snow, there is a method that decreases an elastic modulus at low temperatures and improves traction. Particularly, the braking force on ice is largely affected by an effective-contact area between rubber and ice. In order to enlarge the effective-contact area, a rubber has been desired which is flexible at low temperatures.

On the other hand, where the hardness of rubber alone is decreased using a method that comprises, for example, increasing the amount of oil, studless tires for passenger vehicles have a problem that the handling stability decreases.

Generally, the tread rubber of a studless tire, not only for trucks, buses and light trucks but also for passenger vehicles, contains a natural rubber or a butadiene rubber as a main ingredient and is produced through vulcanization by adding sulfur as a vulcanizing agent in an amount of about 1.5 parts by mass per 100 parts by mass of a rubber component in many cases (for example, see JP 2007-176417 A). This is because these rubbers have a low glass transition temperature and flexibility even though they have high strength. However, reversion occurs when the natural rubber or butadiene rubber is sulfur-vulcanized. In this phenomenon, rubber degrades or its cross-linked state deteriorates, so that the elastic modulus at low temperatures also decreases. However, the inventors of the present invention have found from their studies that the hardness also excessively decreases and thus the handling stability decreases.

Recently, in many cases, tires are produced through vulcanization at high temperatures not less than 170° C. in order to improve the productivity of tires. However, it has been found that the reversion often occurs when the vulcanization is performed at such high temperatures; and this causes decrease in the handling stability. In addition, the reversion may decrease the abrasion resistance and increase tan δ at high temperatures excessively, thereby decreasing fuel economy which is a particularly important property.

SUMMARY OF THE INVENTION

An object of the present invention is to solve the above problems and provide a high performance studless tire for a passenger vehicle which achieves both good braking force and high handling stability on ice or snow.

The present invention relates to a studless tire for a passenger vehicle which comprises a tread having a total sulfur content of 0.7% by mass or less and having a crosslink density of $2.0 \times 10^{-5}$ mol/cm$^3$ or higher.

The tread is desirably made of a rubber composition containing a zinc oxide whisker.

The tread is desirably made of a rubber composition containing a mixture of a zinc salt of an aliphatic carboxylic acid and a zinc salt of an aromatic carboxylic acid.

BRIEF DESCRIPTION OF THE DRAWING

FIG. 1 is a schematic view of a TMA apparatus used for measurement of a crosslink density.

BEST MODE FOR CARRYING OUT THE INVENTION

The studless tire for a passenger vehicle of the present invention comprises a tread having a total sulfur content of 0.7% by mass or less and having a crosslink density of $2.0 \times 10^{-5}$ mol/cm$^3$ or higher. It is possible to reduce the content of unnecessary sulfur and the content of cross-linking sulfur in an undesirable state so as to provide effective and stable cross-linking points if the tread has a total sulfur content that is controlled to a predetermined value or less; and has a crosslink density that is controlled to a predetermined value or higher as mentioned above. Thus, rubber can have the rigidity required for the handling stability on ice or snow. Furthermore, such rubber can be used as a tread rubber that is flexible to small strain and has high grip at low temperatures, so that good braking force on ice or snow can be achieved.

In the tread, the total sulfur content is 0.7% by mass or less, desirably 0.65% by mass or less, more desirably 0.6% by mass or less, even more desirably 0.55% by mass or less, and most desirably 0.5% bymass or less. If the total sulfur content is more than 0.7% by mass, the content of unnecessary sulfur and the content of cross-linking sulfur in an undesirable state increase, and thus the braking force and the handling stability on ice or snow decrease. The total sulfur content is desirably smaller, but is generally required to be 0.2% by mass or more in order to make the crosslink density to $2.0 \times 10^{-5}$ mol/cm$^3$ or higher. The lower limit of the total sulfur content is desirably 0.3% by mass, more desirably 0.4% by mass, and even more desirably 0.45% by mass.

In the tread, the crosslink density (total crosslink density) is $2.0 \times 10^{-5}$ mol/cm$^3$ or higher, desirably $2.1 \times 10^{-5}$ mol/cm$^3$ or higher, more desirably $2.3 \times 10^{-5}$ mol/cm$^3$ or higher, even more desirably $2.5 \times 10^{-5}$ mol/cm$^3$ or higher, and most desirably $3.0 \times 10^{-5}$ mol/cm$^3$ or higher. Furthermore, the crosslink density is desirably $5.1 \times 10^{-5}$ mol/cm$^3$ or lower, more desirably $4.5 \times 10^{-5}$ mol/cm$^3$ or lower, and even more desirably $3.5 \times 10^{-5}$ mol/cm$^3$ or lower. If the crosslink density is lower than $2.0 \times 10^{-5}$ mol/cm$^3$, the hardness of the tread rubber decreases due to the lack of effective cross-linking points, and the handling stability on ice or snow decreases due to the lack of rigidity. If the crosslink density exceeds $5.1 \times 10^{-5}$ mol/cm$^3$, the hardness of the tread rubber tends to increase and thus good braking force on ice or snow tends not to be achieved.

In the tread, the crosslink density of monosulfide bond in a cross-linked form (hereinafter, also referred to as the "mono-crosslink density") is desirably $0.9 \times 10^{-5}$ mol/cm$^3$ or lower, more desirably $0.75 \times 10^{-5}$ mol/cm$^3$ or lower, even more desirably $0.65 \times 10^{-5}$ mol/cm$^3$ or lower, and most desirably $0.55 \times 10^{-5}$ mol/cm$^3$ or lower. The mono-crosslink density is desirably as low as possible, but in actuality, the mono-crosslink density is about $0.1 \times 10^{-5}$ mol/cm$^3$ or higher, about $0.2 \times 10^{-5}$ mol/cm$^3$ or higher, or about $0.4 \times 10^{-5}$ mol/cm$^3$ or higher. If the mono-crosslink density exceeds $0.9 \times 10^{-5}$ mol/cm$^3$, flex crack growth resistance tends to decrease.

The total crosslink density and the mono-crosslink density can be measured through a method disclosed in 2002-17898 A.

In the present invention, it is possible to provide the tread having the above total sulfur content and the crosslink density by, for example, using as a component of rubber composition a mixture of a zinc salt of an aliphatic carboxylic acid and a zinc salt of an aromatic carboxylic acid and/or a zinc oxide whisker as mentioned below; and vulcanizing the rubber composition at low temperatures; as well as adjusting a sulfur amount to be added.

The tread is made of a rubber composition containing a rubber component.

The rubber component is not particularly limited. Examples of the rubber component include natural rubbers (NR), epoxidized natural rubbers (ENR), styrene-butadiene rubbers (SBR), butadiene rubbers (BR), isoprene rubbers (IR), ethylene propylene diene rubbers (EPDM), chloroprene rubbers (CR), acrylonitrilebutadiene rubbers (NBR), butyl-rubbers (IIR), and halogenated butyl rubbers (X-IIR). It is particularly desirable that the NR and/or the ENR be contained because it is possible to be environment friendly, to prepare for a future decrease in oil supply, and to improve the abrasion resistance.

If the rubber component comprises the butadiene rubber, the butadiene rubber content in 100% by mass of the rubber component is desirably 40% by mass or more, more desirably 45% by mass or more, even more desirably 55% by mass or more, and most desirably 60% by mass or more. Furthermore, the butadiene rubber content in 100% by mass of the rubber component is desirably 85% by mass or less, more desirably 75% by mass or less, and even more desirably 65% by mass or less. If the butadiene rubber content is less than 40% by mass, it may be difficult to decrease the glass transition temperature, and the braking force on ice or snow may decrease. If the butadiene rubber content exceeds 85% by mass, good performance on ice and snow may be achieved but the mechanical strength, the abrasion resistance, and the mixing and kneading processability tend to decrease.

In the case of using the butadiene rubber mixed with a natural rubber and/or a polyisoprene rubber together, the total amount of these rubbers in the rubber component is desirably 70% by mass or more. If the amount is 70% by mass or more, it is possible to achieve both good performance on ice and snow and good abrasion resistance, and thereby increase the reversion resistance. The amount of these rubbers is more desirably 80% by mass or more, even more desirably 90% by mass or more, and most desirably 100% by mass.

As the above butadiene rubber, a butadiene rubber may be desirably blended which has a cis content of 95% or more. Blending such a butadiene rubber can improve the abrasion resistance. The viscosity of a solution in toluene is desirably 200 cps or less, and more desirably 150 cps or less. The butadiene rubber with the viscosity exceeding 200 cps may be too viscous, thereby tending to decrease the processability and not to be easily mixed with other rubbers.

A butadiene rubber having a molecular weight distribution (Mw/Mn) of 3.0 to 3.4 maybe used. Use of such a butadiene rubber can improve both processability and abrasion resistance.

The rubber component may comprise at least one functional group (hereinafter referred to as the functional group) selected from the group consisting of alkoxy, alkoxysilyl, epoxy, glycidyl, carbonyl, ester, hydroxy, amino, and silanol. Commercially available rubber or its appropriately modified rubber may be used as a rubber comprising the functional group.

The rubber composition desirably contains a zinc oxide whisker. The zinc oxide whisker can improve the cross-linking efficiency of sulfur so as to form cross-linking points more effectively with a little sulfur content, and greatly improve the grip on ice.

The needle fiber length of the zinc oxide whisker is desirably 1 µm or more and more desirably 10 µm or more. Also, the needle fiber length is desirably 5000 µm or less and more desirably 1000 µm or less. If the needle fiber length is less than 1 µm, the grip on ice tends not to be improved. If the needle fiber length exceeds 5000 µm, the abrasion resistance tends to decrease greatly.

The needle fiber diameter (average value) of the zinc oxide whisker is desirably 0.5 µm or more. Also, the needle fiber diameter is desirably 2000 µm or less and more desirably 200 µm or less. If the needle fiber diameter is less than 0.5 µm, the grip on ice tends not to be improved. If the needle fiber diameter exceeds 2000 µm, the abrasion resistance tends to decrease greatly.

The amount of the zinc oxide whisker per 100 parts by mass of the rubber component is desirably 0.3 parts by mass or more, more desirably 1.3 parts by mass or more, and even more desirably 2.0 parts by mass or more. Also, the amount of the zinc-oxide whisker is desirably 30 parts by mass or less, more desirably 15 parts by mass or less, and even more desirably 7 parts by mass or less. If the amount is less than 0.3 parts by mass, the cross-linking efficiency and the grip on ice tend not to be improved. If the amount exceeds 30 parts by mass, the abrasion resistance tends to decrease and the cost may unnecessarily increase.

The surface of the whisker may be treated with polypropylene (PP), polyethylene (PE), polystyrene (PS), polyurethane (PU), polyvinyl alcohol (PVA), a silane coupling agent, a sylilating agent and the like in order to improve the adhesion force between the zinc oxide whisker and diene rubbers.

The rubber composition desirably contains a mixture of a zinc salt of an aliphatic carboxylic acid and a zinc salt of an aromatic carboxylic acid. The mixture can most effectively improve the cross-linking and most effectively suppress the reversion upon using as the rubber component a natural rubber, an isoprene rubber, and/or particularly a butadiene rubber. Thus, by adding the mixture to the rubber component, the cross-linking effect can be improved and, at the same time, the reversion can be greatly suppressed even in the case that the butadiene rubber content in the rubber component is high. Therefore, it is possible to have a required crosslink density for the present invention with small total sulfur content even in the case of high content of butadiene rubber. Furthermore, a decrease in the abrasion resistance and the mechanical strength resulting from the addition of a butadiene rubber can be suppressed. As a result, both good braking force and high handling stability on ice or snow can be achieved at a high level.

Examples of the aliphatic carboxylic acid include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; aliphatic carboxylic acids chemically synthesized from petroleum or the like. A desirable aliphatic carboxylic acid is the aliphatic carboxylic acid derived from vegetable oils, and a more desirable one is the aliphatic carboxylic acid derived from coconut oil, palm kernel oil or palm oil, because it is possible to be environment friendly, to prepare for a future decrease in oil supply, and to suppress the reversion sufficiently.

The number of carbon atoms in the aliphatic carboxylic acid is desirably 4 or more, and more desirably 6 or more. If the number of carbon atoms in the aliphatic carboxylic acid is less than 4, the dispersibility tends to decrease. The number of carbon atoms in the aliphatic carboxylic acid is desirably 16 or less, more desirably 14 or less, and even more desirably 12 or less. If the number of carbon atoms in the aliphatic carboxylic acid exceeds 16, the reversion tends not to be sufficiently suppressed.

Here, an aliphatic group in the aliphatic carboxylic acid may be one having a chain structure such as an alkyl group or one having a ring structure such as a cycloalkyl group.

Examples of the aromatic carboxylic acid include benzoic acid, phthalic acid, mellitic acid, hemimellitic acid, trimellitic acid, diphenic acid, toluic acid, and naphthoic acid. Among these, the benzoic acid, phthalic acid, or naphthoic acid is desirable because it is possible to suppress the reversion sufficiently.

A content ratio between the zinc salt of the aliphatic carboxylic acid and the zinc salt of the aromatic carboxylic acid in the mixture thereof [molar ratio: (the zinc salt of the aliphatic carboxylic acid)/(the zinc salt of the aromatic carboxylic acid), hereinafter referred to as the "content ratio"] is desirably 1/20 or more, more desirably 1/15 or more, and even more desirably 1/10 or more. If the content ratio is less than 1/20, it may be impossible to be environment friendly and to prepare for a future decrease in oil supply, and the dispersibility and stability of the mixture tend to worsen. Furthermore, the content ratio is desirably 20/1 or less, more desirably 15/1 or less, and even more desirably 10/1 or less. If the content ratio is more than 20/1, the reversion tends not to be sufficiently suppressed.

The zinc content in the mixture is desirably 3% by mass or more, and more desirably 5% by mass or more. If the zinc content in the mixture is less than 3% by mass, the reversion tends not to be sufficiently suppressed. Furthermore, the zinc content in the mixture is desirably 30% by mass or less, and more desirably 25% by mass or less. If the zinc content in the mixture exceeds 30% by mass, the processability tends to decrease and the cost may unnecessarily increase.

The content of the mixture per 100 parts by mass of the rubber component is desirably 0.2 parts by mass or more, more desirably 0.5 parts by mass or more, even more desirably 1.0 part by mass or more, and most desirably 1.4 parts by mass or more. If the content of the mixture is less than 0.2 parts by mass, sufficient reversion resistance may not be ensured and thus it may be difficult to ensure the handling stability and the like. The above content of the mixture is desirably 10 parts by mass or less, more desirably 7 parts by mass or less, and even more desirably 5 parts by mass or less. If the content of the mixture exceeds 10 parts by mass, blooming tends to occur, and the processability tends to decrease due to an excessive decrease in viscosity and an increase in adhesiveness. Furthermore, the effect of adding the mixture tends not to be improved despite the increased amount of the mixture and the cost may unnecessarily increase.

The rubber composition may contain stearic acid. The combination of the stearic acid with the zinc oxide and/or the zinc oxide whisker can improve the cross-linking efficiency and suppress the reversion, although the mixture of the zinc salt of the aliphatic carboxylic acid and the zinc salt of the aromatic carboxylic acid can do so more greatly.

The content of the stearic acid per 100 parts by mass of the rubber component is desirably 0.2 parts by mass or more, and more desirably 0.5 parts by mass or more. Also, the content of the stearic acid per 100 parts by mass of the rubber component is desirably 10 parts by mass or less, more desirably 8 parts by mass or less, and even more desirably 6 parts by mass or less. If the content is less than 0.2 parts by mass, the stearic acid tends not to improve the cross-linking and not to suppress the reversion sufficiently. If the content exceeds 10 parts by mass, blooming tends to occur and the viscosity tends to decrease unnecessarily so as to lower the processability.

The above rubber composition desirably contains an oil or a plasticizer. This makes it possible to adjust the hardness appropriately low and achieve good braking performance on ice. Examples of the oil include paraffinic process oils, aromatic process oils, and naphthenic process oils. Particularly, the paraffinic process oils are suitably used because the low-temperature properties can be improved and excellent performance on ice can be achieved. Specific examples of the paraffinic process oils may include PW-32, PW-90, PW-150 and PS-32 which are produced by Idemitsu Kosan Co., Ltd. Further, specific examples of the aromatic process oils may include AC-12, AC-460, AH-16, AH-24 and AH-58 which are produced by Idemitsu Kosan Co., Ltd.

If the rubber composition contains the oil or the plasticizer, the amount thereof per 100 parts by mass of the rubber component is desirably 5 parts by mass or more, more desirably 10 parts by mass or more, and even more desirably 15 parts by mass or more. If the amount is less than 5 parts by mass, it may be difficult to sufficiently improve the performance on ice. Meanwhile, the amount thereof per 100 parts by mass of the rubber component is desirably 60 parts by mass or less, more desirably 40 parts by mass or less, and even more desirably 30 parts by mass or less. If this component is contained too much, the abrasion resistance may decrease and the reversion resistance may also decrease. Further, even in the case of an aromatic oil or an alternative aromatic oil which leads to a comparatively small decrease in abrasion resistance, the performance on ice and snow may decrease due to a deterioration in low-temperature properties or the rolling resistance may decrease due to an increase in tan δ at high temperatures.

It is desirable that the rubber composition further contains silica. Blending silica can improve the braking performance on ice and the handling stability on ice and snow which are important for studless tires. In particular, the mixture of the zinc salt of the aliphatic carboxylic acid and the zinc salt of the aromatic carboxylic acid can improve the processability of the composition containing silica and can more effectively suppress the reversion of the composition containing silica. Examples of the silica include, but are not limited to, silica produced by a wet process, silica produced by a dry process, and the like.

A nitrogen adsorption specific surface area ($N_2SA$) of the silica is 40 $m^2/g$ or more, and desirably 50 $m^2/g$ or more. If the $N_2SA$ of the silica is less than 40 $m^2/g$, its reinforcing effect may be insufficient. The $N_2SA$ of the silica is 450 $m^2/g$ or less, and desirably 400 $m^2/g$ or less. If the $N_2SA$ of the silica exceeds 450 $m^2/g$, the dispersibility may decrease and heat generation in the rubber composition may increase; thus, this value is not desirable.

The silica content per 100 parts by mass of the rubber component is desirably 10 parts by mass or more, more desirably 15 parts by mass or more, even more desirably 20 parts by mass or more, and particularly desirably 35 parts by mass or more. If the silica content is less than 10 parts by mass, the braking performance on ice and the handling stability on ice and snow tend not to be improved. Furthermore, the silica content per 100 parts by mass of the rubber component is desirably 150 parts by mass or less, more desirably 120 parts by mass or less, even more desirably 100 parts by mass or less, and most desirably 50 parts by mass or less. If the silica content exceeds 150 parts by mass, the processability and the workability may decrease; thus, this value is not desirable.

It is desirable that the rubber composition contain a silane coupling agent.

Any silane coupling agents conventionally used with silica in the rubber industries can be used as the silane coupling agent. Examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazol tetrasulfide, 3-triethoxysilylpropylmethacrylate monosulfide, and 3-trimethoxysilylpropylmethacrylate monosulfide; mercapto-type silane coupling agents such as 3-mercaptopropyl trimethoxysilane, 3-mercaptopropyl triethoxysilane, 2-mercaptoethyl trimethoxysilane, and 2-mercaptoethyl triethoxysilane; vinyl-type silane coupling agents such as vinyl triethoxysilane, and vinyl trimethoxysilane; amino-type silane coupling agents such as 3-aminopropyl triethoxysilane, 3-aminopropyl trimethoxysilane, 3-(2-aminoethyl)aminopropyl triethoxysilane, and 3-(2-aminoethyl)aminopropyl trimethoxysilane; glycidoxy-type silane coupling agents such as γ-glycidoxypropyl triethoxysilane, γ-glycidoxypropyl trimethoxysilane, γ-glycidoxypropyl methyldiethoxysilane, and γ-glycidoxypropyl methyldimethoxysilane; nitro-type silane coupling agents such as 3-nitropropyl trimethoxysilane, and 3-nitropropyl triethoxysilane; chloro-type silane coupling agents such as 3-chloropropyl trimethoxysilane, 3-chloropropyl triethoxysilane, 2-chloroethyl trimethoxysilane, and 2-chloroethyl triethoxysilane. Each of these silane coupling agents may be used alone, or two or more of these may be used in combination.

The content of the silane coupling agent per 100 parts by mass of the silica is 1 part by mass or more, and desirably 2 parts by mass or more. If the content of the silane coupling agent is less than 1 part by mass, effects of blending the silane coupling agent may not be sufficiently exerted. Furthermore, the content of the silane coupling agent per 100 parts by mass of silica is 20 parts by mass or less, and desirably 15 parts by mass or less. If the content of the silane coupling agent exceeds 20 parts by mass, no effects commensurate with the cost increase may be exerted on coupling and the reinforcement and the abrasion resistance may decrease; thus, this value is not desirable.

The rubber composition may contain a compounding ingredient conventionally used in the rubber industries, in addition to the rubber component, the mixture of the zinc salt of the aliphatic carboxylic acid and the zinc salt of the aromatic carboxylic acid, the stearic acid, the oil, the plasticizer, the silica and the silane coupling agent, and a vulcanizing agent such as sulfur and a sulfur-containing compound. Examples of the compounding ingredient may include fillers such as a carbon black and eggshell powder; antioxidants; antiozonants; antiaging agents; vulcanization acceleration aids; zinc oxide; peroxides; and vulcanization accelerators.

The carbon black desirably has an average particle size of 30 nm or less and/or a DBP oil absorption of 100 ml/100 g or more. Blending such a carbon black can impart required reinforcement of studless tires to treads and ensure the block rigidity, handling stability, partial-abrasion resistance, and abrasion resistance. The viscosity of a rubber composition containing a carbon black tends to increase and thereby the processability tends to decrease; however, by using the mixture of the zinc salt of the aliphatic carboxylic acid and the zinc salt of the aromatic carboxylic acid, it is possible to lower the viscosity of unvulcanized rubber so as to improve the processability.

The carbon black content per 100 parts by mass of the rubber component is 2 parts by mass or more, desirably 4 parts by mass or more, more desirably 8 parts by mass or more, and most desirably 20 parts by mass or more. If the carbon black content is less than 2 parts by mass, the reinforcement may be insufficient and thus it may be difficult to ensure the required block rigidity, handling stability, partial-abrasion resistance, and abrasion resistance. Furthermore, the carbon black content per 100 parts by mass of the rubber component is 120 parts by mass or less, desirably 80 parts by mass or less, and more desirably 40 parts by mass or less. If the carbon black content exceeds 120 parts by mass, the processability may decrease and the hardness may be too high.

The above tread has a JIS-A hardness of desirably 50 degrees or less, more desirably 48 degrees or less, and even more desirably 46 degrees or less. If the hardness is 50 degrees or less, it may be possible to ensure flexibility and better performance on ice and snow. Meanwhile, the hardness is desirably 40 degrees or more. If the hardness is less than 40 degrees, the processability of unvulcanized rubber tends to decrease and it may be difficult to ensure both handling stability and suitable hardness.

The studless tire for a passenger vehicle of the present invention has a tire tread produced from the above rubber composition. The passenger vehicle herein represents an automobile usually used for carrying a human passenger. This is the most common type of automobile.

With use of the above rubber composition, the studless tire for a passenger vehicle of the present invention can be produced by a usual method. That is, the studless tire can be produced by preparing a tire tread with use of the rubber composition, laminating the tread with other members, and heating it on a tire molding machine under pressure.

EXAMPLES

Although the present invention is more specifically described based on Examples, the present invention is not limited to these Examples.

In the following, respective chemical agents used in Examples and Comparative Examples are listed.

Natural rubber (NR): RSS #3

BR: BR 150B (cis-1,4 bond content: 97%, $ML_{1+4}$ (100° C.) : 40, viscosity of a 5% solution in toluene at 25° C.: 48 cps, Mw/Mn: 3.3) produced by Ube Industries, Ltd.

Carbon black: DIABLACK I (ISAF carbon, average particle size: 23 nm, DBP oil absorption: 114 ml/100 g) produced by Mitsubishi Chemical Corporation Silica: Ultrasil VN3 ($N_2SA$: 175 $m^2/g$) produced by Degussa Silane coupling agent: Si-69 produced by Degussa Mineral oil: PS-32 (paraffinic process oil) produced by Idemitsu Kosan Co., Ltd.

Stearic acid: KIRI produced by NOF Corporation

Anti-reversion agent (mixture of zinc salt of aliphatic carboxylic acid and zinc salt of aromatic carboxylic acid): Activator 73A [(i) zinc salt of aliphatic carboxylic acid: -zinc salt of fatty acid ($C_8$ to $C_{12}$) derived from coconut oil, (ii) zinc salt of aromatic carboxylic acid: zinc benzoate, content molar ratio: 1/1, zinc content: 17% by mass] produced by Struktol Company Zinc oxide: Zinc oxide #2 produced by Mitsui Mining & Smelting Co., Ltd.

Zinc oxide whisker: PANATETRA WZ-0501 (the number of protrusions: 4, needle fiber length: 2 to 50 μm, needle fiber diameter (average value): 0.2 to 3.0 μm) produced by AMTEC Co., Ltd.

Antiaging agent: NOCRAC 6C (N-(1,3-dimethylbuthyl)-N'-phenyl-p-phenylenediamine) produced by OUCHI SHINKO CHEMICAL INDUSTRIAL CO., LTD.

Wax: OZOACE wax produced by Nippon Seiro Co., Ltd.

Sulfur: Sulfur powder produced by Tsurumi Chemical Industry Co., Ltd.

Vulcanization accelerator BBS: NOCCELER NS (N-tert-buthyl-2-benzothiazolylsulfenamide) produced by OUCHI SHINKO CHEMICAL INDUSTRIAL Co., LTD.

Vulcanization accelerator DPG: NOCCELER D (N,N'-diphenylguanidine) produced by OUCHI SHINKO CHEMICAL INDUSTRIAL Co., LTD.

Examples 1 to 7 and Comparative Examples 1 to 7

According to the formulation shown in Table 1, a Banbury mixer was charged with the chemical agents in amounts shown in Process 1 in Table 1 (at this time, the sulfur and the vulcanization accelerator were not added). They were then mixed and kneaded for five minutes so as to raise the outlet temperature to about 150° C. Thereafter, the sulfur and the vulcanization accelerator in amounts shown in Process 2 were added to the mixture obtained by Process 1, and they were mixed and kneaded for three minutes at about 80° C. by an open roll mill. Thereby, an unvulcanized rubber composition was obtained. This unvulcanized rubber composition was formed into a tread shape, laminated with other tire components, and then vulcanized for 15 minutes at 170° C., whereby studless tires in the respective Examples and Comparative Examples were produced. In Examples 4 and 5, the vulcanization conditions were changed to perform vulcanization for 45 minutes at 150° C.

The respective samples were evaluated by the following methods.

(Reversion)

Using a curelastometer, a vulcanization curve of the unvulcanized rubber composition at 170° C. was determined. The maximum torque rise (MH-ML) was regarded as 100, and a torque rise obtained 20 minutes after the start of vulcanization was expressed as a relative value. Then, a value obtained by subtracting the relative value from 100 was regarded as a reversion ratio. A lower reversion ratio shows that the reversion is more suppressed and better reversion resistance is achieved. In Examples 4 and 5, a vulcanization curve at 150° C. was determined, a torque rise obtained 45 minutes after the start of vulcanization was expressed as a relative value, and a reversion ratio was similarly obtained.

(Hardness)

In accordance with JIS K 6253 "Rubber, vulcanized or thermoplastic—Determination of hardness", the hardness of vulcanized rubber samples in the respective Examples and Comparative Examples was determined by a type A durometer.

(Performance on Ice and Snow)

Using the studless tires (pneumatic tires for winter) of the respective Examples and Comparative Examples, actual vehicle performance on ice and snow was evaluated under the following conditions. Here, studless tires for a passenger vehicle, which have a size of 195/65 R15 and a DS-2 pattern, were produced as the pneumatic tires for winter, and the tires were mounted on a FR car of 2000 cc displacement. The test was run on the test course of Sumitomo Rubber Industries, Ltd. in Nayoro, Hokkaido, Japan. The temperature on ice was from −6 to −1° C. and the temperature on snow was from −10 to −2° C.

Handling performance (handling stability): Starting, accelerating and stopping of the above car on snow were evaluated by a test driver's feelings. In the evaluation, Comparative Example 1 was regarded as the standard, which was graded 100. Then, grading was performed in such a manner that the tires were graded 120 if the test driver judged that their performance was obviously improved, and the tires were graded 140 if the test driver judged that they were at a high level never seen before.

Braking performance (brake stopping distance on ice) The stopping distance on ice, which is the distance required for the car to stop after stepping on brakes that lock up at 30 km/h, was measured. Then, Comparative Example 1 was taken as a reference and the performance was calculated from the following equation:

(Braking performance index)=(Brake stopping distance in Comparative Example 1)/(Stopping distance)×100.

(Abrasion Resistance)

Using the tread rubbers in the respective Examples and Comparative Examples, studless tires for a passenger vehicle having a size of 195/65 R15 and a DS-2 pattern were produced, and the tires were mounted on a FR car of 2000 cc displacement.

The depth of grooves on the tire tread part was measured after the car had run 8000 km. The running distance that makes the depth of the tire grooves decrease by 1 mm was calculated, and the abrasion resistance was expressed with an index calculated from the following equation:

(Abrasion resistance index)=(Running distance at which groove depth is decreased by 1 mm)/(Running distance at which tire groove depth in Comparative Example 1 is decreased by 1 mm)×100.

A larger index shows better abrasion resistance.

(Flex Crack Growth Resistance)

In accordance with JIS K 6260 "Testing method of flex cracking and crack growth for rubber, vulcanized or thermoplastic (De Mattia)", the vulcanized rubber composition samples produced in the respective Examples and Comparative Examples were tested. That is, the length of a crack formed after the sample had been submitted to one million times of bending; or the number of bendings when the crack had grown up to 1 mm was measured at a temperature of 23° C. with a relative humidity of 55%. The number of bendings of each sample when the crack on the sample had grown up to 1 mm was expressed as a common logarithm value, based on the obtained crack length or the obtained number of bendings. Furthermore, the obtained common logarithm value was expressed as an index based on the value of Comparative Example 1 taken as 100.

Here, each of the rubber composition samples was repeatedly bended at an elongation ratio of 50% of its original length. A larger index shows that a crack grows up less easily and thus the flex crack growth resistance is more excellent.

(Total Sulfur Content)

The total sulfur content was measured according to a method disclosed in JIS K 6350 (1976) "Method of analysis for rubber goods" at a section of "determination of total sulfur content" on pages 6-7 (in Japanese edition).

(Crosslink Density, Mono-crosslink Density)

The crosslink density was calculated as follows.

First, a (round) columnar sample 3 mm in diameter was punched out of the respective vulcanized rubber sheets produced in the respective Examples and Comparative Examples. This sample was immersed in acetone at 20° C. for 24 hours, and thus an oil and an antiaging agent were extracted. The sample after the extraction was immersed in a mixed solvent of tetrahydrofuran (THF) and benzene (1:1, Mass/Mass) at 20° C. for 24 hours to be swollen.

Next, the sample was introduced into a TMA apparatus (FIG. 1) filled with a mixed solvent of tetrahydrofuran (THF) and benzene (1:1, Mass/Mass) at 20° C. Then, a value of $(\tau_0/(1/\alpha^2-\alpha))$ was determined from the relationship between compression stress and strain in the TMA apparatus. Thus obtained value and dimensions of the sample were substituted into the following equation (I), Flory's theoretical equation, and the total crosslink density $(\nu_T)$ of the rubber was calculated. The test was performed on three samples and the results were averaged.

Measurement for calculating the crosslink density $(\nu_M)$ of monosulfide bond was performed in the same manner as in the measurement of the total crosslink density $(\nu_T)$ mentioned above, except that a LiAlH$_4$ catalyst was added to the 1:1 mixture of tetrahydrofuran (THF) and benzene and then the sample was swollen. The crosslink density $(\nu_M)$ of monosulfide bond was calculated according to the equation (I) with $(\nu_T)$ replaced with $(\nu_M)$.

[Equation I]

$$\nu_T = \frac{\nu e'}{V0'} = \frac{\tau_0}{RT\left(\alpha - \frac{1}{\alpha^2}\right)} \sqrt[3]{\frac{1-\phi}{(Ls0/L0)^3 - \phi}} \quad (I)$$

$\tau_0$: stress=F/A0 [g/mm$^2$]
F: stress [g]
ve: the number of cross-linking points
ve': the number of cross-linking points [mol]
k: Boltzmann constant 1.381×10$^{-23}$ [J/K]
R: gas constant 8.314 [J/mol·K]→R=kNa (Na: Avogadro's constant=6.02×10$^{-23}$ mol$^{-1}$)
T: measurement temperature [K]
V0: total volume of sample [mm$^3$]
V0': pure rubber polymer volume=V0(1-φ) [mm$^3$]
φ: filler volume fraction (filler volume/total rubber volume)
α: compression ratio of sample after swelling=Ls/Ls0
L0: sample length before swelling [mm]
Ls: compressed swollen-sample length [mm]
Ls0: sample length after swelling [mm]
A0: edge area of sample before swelling [mm$^2$]
A1: edge area of sample after swelling=A0(Ls0/L0) [mm$^2$]

Here, $\tau_0$ can be determined according to the following equation:

$$\tau_0 = \frac{RT\nu e'}{V0'} \sqrt[3]{\frac{(Ls0/L0)^3 - \phi}{1-\phi}} \left(\alpha - \frac{1}{\alpha^2}\right).$$

Table 1 shows evaluation results of the respective tests.

TABLE 1

| | | | Examples | | | | | | |
|---|---|---|---|---|---|---|---|---|---|
| | | | 1 | 2 | 3 | 4 | 5 | 6 | 7 |
| Amount (parts by mass) | Process 1 | NR | 40 | 40 | 40 | 40 | 40 | 40 | 40 |
| | | BR | 60 | 60 | 60 | 60 | 60 | 60 | 60 |
| | | Carbon black | 30 | 30 | 30 | 30 | 5 | 30 | 30 |
| | | Silica | 25 | 25 | 25 | 25 | 50 | 25 | 25 |
| | | Silane coupling agent | 2 | 2 | 2 | 2 | 4 | 2 | 2 |
| | | Mineral oil | 25 | 25 | 25 | 25 | 25 | 25 | 25 |
| | | Stearic acid | — | — | — | 1 | 1 | — | 3 |
| | | Anti-reversion agent | 3 | 3 | 3 | — | — | 3 | 3 |
| | | Zinc oxide | 3 | 3 | 3 | 3 | 3 | 3 | 3 |
| | | Zinc oxide whisker | — | — | — | — | — | 5 | 5 |
| | | Antiaging agent | 1.5 | 1.5 | 1.5 | 1.5 | 1.5 | 1.5 | 1.5 |
| | | Wax | 1 | 1 | 1 | 1 | 1 | 1 | 1 |
| | Process 2 | Sulfur | 0.75 | 0.50 | 0.35 | 0.50 | 0.50 | 0.50 | 0.50 |
| | | Vulcanization accelerator BBS | 1.0 | 1.0 | 1.0 | 1.0 | 1.0 | 1.0 | 1.0 |
| | | Vulcanization accelerator DPG | 1.5 | 1.5 | 1.5 | 1.5 | 1.5 | 1.5 | 1.5 |
| Vulcanization condition | | | 170° C. | 170° C. | 170° C. | 150° C. | 150° C. | 170° C. | 170° C. |
| Total sulfur content (% by mass) | | | 0.61 | 0.49 | 0.41 | 0.49 | 0.59 | 0.47 | 0.47 |
| Crosslink density (10$^{-5}$ mol/cm$^3$) | | | 2.8 | 2.3 | 2.2 | 2.4 | 2.3 | 3.0 | 3.1 |
| Mono-crosslink density (10$^{-5}$ mol/cm$^3$) | | | 0.53 | 0.52 | 0.60 | 0.51 | 0.49 | 0.53 | 0.54 |
| Evaluation results | Reversion ratio (reversion resistance) | | 2 | 0.5 | 0 | 0.5 | 0.3 | 0.2 | 0 |
| | Hardness | | 47 | 46 | 45 | 46 | 46 | 47 | 47 |
| | Handling performance (on snow) | | 130 | 125 | 115 | 119 | 122 | 129 | 131 |
| | Braking performance (on ice) | | 104 | 107 | 111 | 109 | 122 | 127 | 125 |
| | Abrasion resistance | | 118 | 119 | 107 | 121 | 109 | 109 | 106 |
| | Flex crack growth resistance | | 105 | 110 | 115 | 108 | 115 | 105 | 107 |

| | | | Comparative Examples | | | | | | |
|---|---|---|---|---|---|---|---|---|---|
| | | | 1 | 2 | 3 | 4 | 5 | 6 | 7 |
| Amount (parts by mass) | Process 1 | NR | 40 | 40 | 40 | 40 | 40 | 40 | 40 |
| | | BR | 60 | 60 | 60 | 60 | 60 | 60 | 60 |
| | | Carbon black | 30 | 30 | 30 | 30 | 30 | 30 | 30 |

TABLE 1-continued

|  |  | | | | | | | |
|---|---|---|---|---|---|---|---|---|
|  | Silica | 25 | 25 | 25 | 25 | 25 | 25 | 25 |
|  | Silane coupling agent | 2 | 2 | 2 | 2 | 2 | 2 | 2 |
|  | Mineral oil | 25 | 25 | 25 | 25 | 25 | 25 | 25 |
|  | Stearic acid | 1 | 1 | 1 | 1 | 1 | 1 | 1 |
|  | Anti-reversion agent | — | 3 | — | — | — | — | — |
|  | Zinc oxide | 3 | 3 | 3 | 3 | 3 | 3 | 3 |
|  | Zinc oxide whisker | — | — | — | — | — | — | — |
|  | Antiaging agent | 1.5 | 1.5 | 1.5 | 1.5 | 1.5 | 1.5 | 1.5 |
|  | Wax | 1 | 1 | 1 | 1 | 1 | 1 | 1 |
| Process 2 | Sulfur | 1.50 | 1.50 | 1.00 | 0.75 | 0.50 | 0.35 | 0.25 |
|  | Vulcanization accelerator BBS | 1.0 | 1.0 | 1.0 | 1.0 | 1.0 | 1.0 | 1.0 |
|  | Vulcanization accelerator DPG | 1.5 | 1.5 | 1.5 | 1.5 | 1.5 | 1.5 | 1.5 |
| Vulcanization condition | | 170° C. | 170° C. | 170° C. | 170° C. | 170° C. | 170° C. | 170° C. |
| Total sulfur content (% by mass) | | 1.0 | 0.99 | 0.75 | 0.62 | 0.49 | 0.41 | 0.36 |
| Crosslink density ($10^{-5}$ mol/cm$^3$) | | 3.4 | 5.2 | 1.9 | 1.8 | 1.2 | 1.0 | 0.8 |
| Mono-crosslink density ($10^{-5}$ mol/cm$^3$) | | 0.46 | 0.99 | 0.34 | 0.29 | 0.23 | 0.17 | 0.12 |
| Evaluation results | Reversion ratio (reversion resistance) | 18 | 5 | 14 | 11 | 9 | 6 | 3 |
|  | Hardness | 46 | 48 | 44 | 43 | 42 | 41 | 40 |
|  | Handling performance (on snow) | 100 | 127 | 90 | 87 | 83 | 77 | 71 |
|  | Braking performance (on ice) | 100 | 102 | 105 | 107 | 109 | 111 | 113 |
|  | Abrasion resistance | 100 | 113 | 91 | 87 | 83 | 79 | 76 |
|  | Flex crack growth resistance | 100 | 80 | 109 | 112 | 114 | 115 | 111 |

Each of the samples of Examples 1 to 7 had a low total sulfur content of 0.7% by mass or less and a crosslink density of $2.0 \times 10^{-5}$ mol/cm$^3$ or higher, so that the samples are considered to contain no unnecessary sulfur and to be in a good cross-linked state. Therefore, both high handling performance on snow and high braking performance on ice were achieved in these Examples. The abrasion resistance was also good.

Each of the samples further showed a low reversion ratio, that is, each was able to suppress the reversion. In addition, the hardness was appropriate. Moreover, the mono-crosslink density was appropriate and the flex crack growth resistance was also good.

The rubber composition in Example 5, containing much more silica, and the rubber compositions in Examples 6 and 7, containing the zinc oxide whisker, achieved even higher braking performance on ice. The handling performance on snow was also good. Moreover, the reversion ratio was low.

On the other hand, in Comparative Example 1, the total sulfur content was too much and the handling performance on snow was not so good. In Comparative Examples 3 to 7, the crosslink density was too low and the handling performance on snow was not good. Furthermore, the reversion ratio was high or somewhat high.

In Comparative Example 2, the total sulfur content was high and the crosslink density was high, in particular the mono-crosslink density was high, so that the flex crack growth resistance was not good.

Industrial Applicability

According to the present invention, it is possible to provide a high performance studless tire for a passenger vehicle, which has both good braking force and high handling stability on ice or snow, by using a tread having a total sulfur content of 0.7% by mass or less and having a crosslink density of $2.0 \times 10^{-5}$ mol/cm$^3$ or higher.

The invention claimed is:

1. A studless tire for a passenger vehicle, comprising:
a tread having a total sulfur content of 0.7% by mass or less and having a crosslink density of $2.0 \times 10^{-5}$ mol/cm$^3$ or higher,
wherein the tread is made of a rubber composition containing a rubber component comprising a butadiene rubber content of 45% to 85% by mass based on 100% by mass of the rubber component,
wherein the rubber composition further contains a mixture of a zinc salt of an aliphatic carboxylic acid and a zinc salt of an aromatic carboxylic acid,
wherein the amount of the mixture of the zinc salt of the aliphatic carboxylic acid and the zinc salt of the aromatic carboxylic acid is 0.2 to 10 parts by mass per 100 parts by mass of the rubber component,
wherein the number of carbon atoms of the aliphatic carboxylic acid is 4 to 16, and
wherein the aromatic carboxylic acid is at least one member selected from the group consisting of benzoic acid, ophthalmic acid and naphthoic acid.

2. The studless tire for a passenger vehicle according to claim 1,
wherein the tread is made of a rubber composition containing a zinc oxide whisker.

3. The studless tire for a passenger vehicle according to claim 1,
wherein the tread is made of a rubber composition containing a rubber component,
wherein the rubber component contains a natural rubber and/or an epoxidized natural rubber, and a butadiene rubber, and
wherein the butadiene rubber is present in an amount of 45% to 85% by mass based on 100% by mass of the rubber component.

4. The studless tire for a passenger vehicle according to claim 1,
wherein the tread is made of a rubber composition containing a rubber component, and an oil or a plasticizer,
wherein the amount of the oil or the plasticizer per 100 parts by mass of the rubber component is 5 to 60 parts by mass.

5. The studless tire for a passenger vehicle according to claim 1,
wherein the tread is made of a rubber composition containing a rubber component, and a silica,
wherein the silica content per 100 parts by mass of the rubber component is 10 to 150 parts by mass.

6. The studless tire for a passenger vehicle according to claim 1,
wherein the tread is made of a rubber composition containing a rubber component, a silica, and a carbon black, and
wherein the silica content per 100 parts by mass of the rubber component is 10 to 150 parts by mass, and the carbon black content per 100 parts by mass of the rubber component is 2 to 120 parts by mass.

7. The studless tire for a passenger vehicle according to claim 1,
wherein the tread has a JIS-A hardness of 40 to 50 degrees.

8. The studless tire for a passenger vehicle according to claim 1,
wherein the tread has a crosslink density of monosulfide bond of $0.1 \times 10^{-5}$ to $0.9 \times 10^{-5}$ mol/cm$^3$.

9. The studless tire for a passenger vehicle according to claim 1,
wherein the amount of the mixture of the zinc salt of the aliphatic carboxylic acid and the zinc salt of the aromatic carboxylic acid is 1.4 to 5 parts by mass per 100 parts by mass of the rubber component.

* * * * *